(12) United States Patent
Benitz

(10) Patent No.: US 6,608,585 B2
(45) Date of Patent: Aug. 19, 2003

(54) HIGH-DEFINITION IMAGING APPARATUS AND METHOD

(75) Inventor: Gerald R. Benitz, Harvard, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 10/086,202

(22) Filed: Feb. 28, 2002

(65) Prior Publication Data

US 2003/0071750 A1 Apr. 17, 2003

Related U.S. Application Data

(60) Provisional application No. 60/273,029, filed on Mar. 2, 2001.

(51) Int. Cl.$^7$ ................................. G01S 13/90

(52) U.S. Cl. .................. 342/25; 342/192; 342/194; 342/196

(58) Field of Search ............ 342/25, 98, 99, 342/159, 162, 189, 190, 191, 192, 193, 194, 195, 196

(56) References Cited

U.S. PATENT DOCUMENTS

| 5,477,221 A | | 12/1995 | Chang et al. ............... 341/51 |
| 5,923,278 A | * | 7/1999 | Poehler et al. .............. 342/25 |
| 6,085,151 A | * | 7/2000 | Farmer et al. ............. 701/301 |
| 6,400,306 B1 | * | 6/2002 | Nohara et al. .............. 342/25 |

FOREIGN PATENT DOCUMENTS

| DE | 196 18 155 A1 | | 5/1996 |
| WO | WO-2071096 A2 | * | 9/2002 |

OTHER PUBLICATIONS

"Effectiveness of spatially–variant apodization", Jung Ah Choi Lee; Munson, D.C., Jr.;Image Processing, 1995. Proceedings., International Conference on , vol.: 1 , Oct. 23–26, 1995 pp.: 147–150 vol. 1.*

"Synthetic aperture radar interferometry: a model for the joint statistics in layover areas", Wilkinson, A.J.; Communications and Signal Processing, 1998. COMSIG '98. Proceedings of the 1998South African Symposium on , Sep. 7–8, 1998 pp.: 333–33.*

A new scattering enhancement scheme for polarimetric SAR images based on covariance matrix', Qong M.; Geoscience and Remote Sensing Symposium, 2002. IGARSS '02. 2002 IEEE International, vol. 2 , 2002 pp.: 1023–1025 vol.2.*

(List continued on next page.)

Primary Examiner—John B. Sotomayor
(74) Attorney, Agent, or Firm—Samuels, Gauthier & Stevens, LLP

(57) ABSTRACT

A high-definition radar imaging system and method receives image data and adaptively processes the image the data to provide a high resolution image. The imaging technique employs adaptive processing using a constrained minimum variance method to iteratively compute the high-definition image. The high-definition image I is expressed in range and cross-range as $I(r,c)=\min \omega^H R \omega$, where $\omega$ is a weighting vector and R is a covariance matrix of the image data. A solution for $I(r,c)$ is approximated by i) forming $Y=[x_1 \ldots x_K]^T/\sqrt{K}$ where $x_1 \ldots x_k$ are beamspace looks formed from image domain looks and with $y_1$, $y_2$, and $y_3$ denoting the K×1 columns of Y; ii) computing $r_{21}=y_2^T y_1$ and $r_{31}=y_3^T y_1$, and $b=r_{21}y_2+r_{31}y_3$; computing $\gamma$ as $$\gamma = \min\left(\frac{r_{21}^2 + r_{31}^2}{b^T b}, \sqrt{\frac{\beta-1}{r_{21}^2 + r_{31}^2}}\right);$$

and iii) computing $I(r,c)$ as $I(r,c)=\|y_1-\gamma b\|^2$.

18 Claims, 13 Drawing Sheets

OTHER PUBLICATIONS

"Weighted least–squares estimation of phase errors for SAR/ISAR autofocus", Wei Ye; Tat Soon Yeo; Zheng Bao; Geoscience and Remote Sensing, IEEE Transactions on , vol.: 37 Issue: 5 , Sep. 1999 pp.: 2487–2494.*

"Signal Processing Techniques for Radar Imaging"; Nash et al.; Microwave Radar Division, Surveillance Research Laboratory Defence Science & Technology Organization, Salisbury, SA, Australia, Apr. 18–20, 1990; pp.: 485–491.

"Superresolution Techniques and ISAR Imaging"; W. F. Gabriel, Radar Division, Naval Research Laboratory, Washington, D.C.; Proceedings of the 1989 IEEE National Radar Conference; Mar. 29–30, 1989; pp.: 48–55.

"SAR Imaging via Modern 2–D Spectral Estimation Methods"; Stuart R. DeGraaf; IEEE Transactions on Image Processing, vol. 7, No. 5, May 1998; pp.: 729–761.

"SAR Imaging using the Capon estimator in the 2–D subarray processing framework"; Kim et al.; Proceedings of the International Society for Optical Engineering; vol. 4123; Jul. 31–Aug. 1, 2000; pp.: 216–223.

"Spatially Variant Apodization for Image Reconstruction from Partial Fourier Data"; Lee et al.; IEEE Transactions on Image Processing, vol. 9, No. 11, Nov. 2000; pp.: 1914–1925.

"High Definition Vector Image"; Gerald R. Benitz; Massachusetts Institute of Technology; Lincoln Laboratory Journal; Special Issue on Superresolution; vol. 10, No. 2, 1997.

* cited by examiner (a) Taylor weighting    (b) B-HDI (a) Taylor weighting    (B-HDI)

HIGH-DEFINITION IMAGING APPARATUS AND METHOD

CROSS REFERENCE TO RELATED APPLICATIONS

This application claims priority to the provisional application designated Ser. No. 60/273,029, entitled *"Beamspace High-Definition Imaging"* and filed Mar. 2, 2001. This application is also hereby incorporated by reference.

GOVERNMENT RIGHTS

This invention was made with government support under Defense Advanced Research Projects Agency Contract F19628-95-C-0002. The government has certain rights in the invention.

TECHNICAL FIELD

The invention relates to the field of signal processing, and in particular to a signal processing apparatus and method that processes data captured from a sensor such as synthetic aperture radar to provide a high-resolution image.

BACKGROUND OF THE INVENTION

Synthetic aperture radar (SAR) is a well known technique for imaging stationary objects. SAR is an all weather imaging radar system that provides a high-resolution image in both the range dimension and the cross range dimension. Range resolution is achieved in a well known manner by using either a high bandwidth fixed frequency transmit pulse or a frequency modulated (FM) transmit pulse. Resolution in the cross range dimension is achieved by synthesizing a large antenna aperture.

In a conventional non-synthetic aperture radar system, resolution in the cross range dimension is:

$$\delta_{cr} = R\theta_B \quad (1)$$

where:

$\delta_{cr}$=cross range

R=range $\theta_B$=beamwidth of the transmitted signal in radians

Therefore, to improve the cross range resolution $\delta_{cr}$, the beamwidth $\theta_B$ must be decreased. $\theta_B$ is defined as:

$$\theta_B = (k\lambda)/D \quad (2)$$

where:

k=constant $\lambda$=wavelength of the transmitted signal (i.e., $c/f_c$)

D=antenna width c=speed of light $f_c$=carrier frequency

Substituting (2) into (1), one can see that for improved cross range resolution $\delta_{cr}$, the radar designer can either increase the antenna width D or decrease the wavelength $\lambda$ of the transmitted signal. However, there are clearly limits on how large the antenna width D can get (especially on an airborne platform) to achieve cross range resolution satisfactory for imaging. Similarly, the wavelength $\lambda$ can be decreased only so far before it becomes so short that the radar performance becomes degraded in foul weather conditions (e.g., rain, snow, and sleet), or the system becomes impractical because of the bandwidth requirement. SAR solves this problem by employing signal processing techniques which allow a larger antenna of width D' to be synthesized using the motion of the radar platform (e.g., an antenna mounted on an aircraft). That is, SAR achieves cross range resolution by using the motion of the vehicle carrying the radar to generate a synthesized antenna of size D' sequentially, rather than simultaneously as in the case with a real antenna of the same size.

The key to SAR is the data processing of stored reflected return data, and the amplitude weighting, phase shifting and coherently summing of the data to form the synthetic aperture radar antenna of width D'. For an overview of SAR see *"An Introduction to Synthetic Aperture Radar"* by W. M. Brown and L. J. Porcelli, IEEE Spectrum (September, 1969) pages 52–62.

An airborne SAR system is typically used to map or image a specific ground terrain (also referred to herein as a SAR scene). As an example, FIG. 1 illustrates a SAR equipped aircraft 20 flying along a flight path 22 monitoring a certain SAR scene 24. The SAR equipped aircraft 20 transmits a series of RF pulses towards the SAR scene 24 and receives backscattered RF energy whose information content is indicative of the terrain and other reflecting objects on the terrain (e.g., buildings, trucks, cars, ships, planes . . . ). A short time later, the aircraft 20 is located at a second location 28 along the flight path 22 and again transmits RF energy towards the SAR scene 24. As known, the distance traveled by the aircraft between pulse transmissions should be less than one-half the illuminating aperture size when the radar's line of sight is perpendicular to the platforms velocity vector. The received RF energy at the second location 28 is again indicative of the SAR scene, but this time it is taken from a different view. Since radar signals travel at the speed of light, it is known precisely when a return signal is likely to come from SAR scene 24 at a given range from the aircraft 20. Accordingly, for each transmitted RF pulse there will be a plurality of return signals corresponding to the various scatterers within the SAR scene located at various ranges from the aircraft. These returns can be processed in real-time or off-line to create an image of the SAR scene 24 and stationary objects therein using the Doppler history of the objects. That is, each return signal contains the radar carrier frequency signal $f_c$ component with a Doppler shift in frequency ($f_c f_d$), which in reality is the phase of the backscattered signal as a function of time with respect to the phase of the transmitted signal.

Referring to FIG. 2, an SAR system 30 includes an antenna 32 that transmits pulsed RF energy (e.g., X or Ku band) and receives backscattered RF energy from the illuminated SAR scene 24 (FIG. 1). The radar system 30 includes an exciter 34 and an amplifier 36 which generate and provide an uncompressed pulse of RF energy signal on a line 38 that is coupled to the antenna 32.

To obtain fine range resolution, a linear FM waveform is used in which frequency value $f_c$ is changed linearly from a frequency value $f_1$ to a value $f_2$ over the transmitted pulse length $\tau$. This allows the radar to utilize a long pulse to achieve a large amount of radiated energy while retaining the range resolution associated with a shorter pulse. Other known pulse compression techniques include nonlinear FM, discrete frequency shift, polyphase codes, phase coded pulse compression, compound Barker codes, coding sequences, complementary codes, pulse burst and stretch.

During receive mode, each antenna 32 receives backscattered RF energy data indicative of the SAR scene 24 (FIG. 1) being imaged and provides a received signal on a line 42 to a receiver 44. The receiver 44 coherently processes the received signal data and provides a received signal on a line 46 containing both in-phase(I) and quadrature(Q) data to a signal processor 48 A coherent reference signal is generally required for the signal processing since an azimuth angle measurement is a measurement of phase from spatially separate positions. That is, the coherent radar remembers the phase difference from transmission of a pulse to reception of the backscattered energy from the pulse. The received signals contain the carrier signal $f_c$ with a Doppler shift $f_d$ in frequency, which in reality is its phase versus time.

Each backscattered RF signal is often converted to a digital signal format as early as possible in the signal processing sequence due to the greater degree of design flexibility inherent in the discrete time domain. This often occurs after the RF received signal has been bandshifted to an intermediate frequency (IF) and then to a video signal having both an in-phase(I) and quadrature(Q) component. The sampling rate of the analog-to-digital converter (ADC) (not shown) must be fast enough to meet the well-known Nyquist sampling criteria to prevent aliasing. Once sampled and digitized, the received video signal containing the I and Q signal components can be processed by the signal processor 48 to image objects within the SAR scene. A radar processor/controller 50 controls the operation of the radar system based upon inputs received from an operator control panel/interface 52 and the current operating condition of the radar system. Images formed by the signal processor are presented on a display 54. The system also includes a memory storage 56 wherein received data can be stored for subsequent, non-realtime processing.

FIG. 3 illustrates a top-level functional block diagram of signal processing routines 60 performed either in real-time or off-line to image stationary object within the SAR scene 24 (FIG. 1). To implement the routines in real-time, one skilled in the art will appreciate that the signal processor 48 requires a large amount of data storage and processing power.

The signal processor 48 executes a data calibration routine 62 that receives the digitized in-phase(I) and quadrature (Q) signals on the line 46 from the receiver 46 (FIG. 2) to correct for any front-end hardware inaccuracies. The processing steps may include subroutines to: i) remove the DC biases of the channel's ADC; ii) ensure that the in-phase(I) and quadrature(Q) components of the signal are in true quadrature; iii) balance the I-Q gains and correct for receive chain mismatches including time alignment; and iv) gain and phase versus frequency alignment. The data calibration routine also includes a pulse compression subroutine that provides compressed data in a well known manner in the frequency versus time domain. Pulse compression techniques used to increase the total RF energy while maintaining high range resolution are well known. Once complete, the data calibration routine 62 provides calibrated received signals on a line 64. In general, the data calibration routine 62 may include as many hardware receiver chain error corrections as necessary to reduce the amount of error introduced by the receiver 44 to an acceptable systems level. The next processing step is to motion compensate the calibrated received signals on line 64.

As known, the motion compensation routine compensates for the aircraft motion with respect to the SAR scene 24 (FIG. 1). Because the aircraft is not flying along a straight line or at a constant velocity, the backscattered energy experiences a frequency shift and time delay, both as a function of time, which must be corrected to provide a coherent phase history of the stationary objects during the dwell time. The dwell time as used herein is the period of time over which the radar system illuminates an area and generally is about 0.1 second to about 10 seconds, or more. These corrections are required in a high resolution SAR in order to keep the individual scattering elements on a reflecting target coherent over the dwell period and at squint angles other than 90°. In general, motion compensation is well known and involves electronically adjusting the phase of the received signals on the line 64. Ideally, the processed synthetic aperture information is completely isolated from the effects of undesired aircraft motion during the dwell time.

The distance the aperture has moved pulse-to-pulse is typically calculated based upon information obtained from an inertial navigation system (INS), an inertial measurement unit (IMU), and/or a global positioning system (GPS) (all not shown). The position measurement signals are provided on a line 68 and the motion compensation routine computes a correction signal value that represents the amount of time delay to be applied to the calibrated received signals on the line 64 to provide motion compensated received signals on a line 70. A new time delay (i.e., a time shift) is applied for each pulse or synthesized pulse, if multiple pulses are used to achieve the desired bandwidth using pulse compression techniques. The following papers discuss motion compensation and the details of performing the same: *"Motion Compensation for Synthetic Aperture Radar"* by J. C. Kirk, Jr, IEEE Transaction on Aerospace and Electronic Systems, Vol. AES-11, No. 3 (May 1975); *"Synthetic Aperture Imaging With Maneuvers"* by J. H. Minns and J. L. Farrell,); IEEE Transactions on Aerospace and Electronic Systems, Vol. AES-8, No. 4 (July 1972); and *"Effects of Navigation Errors in Maneuvering SAR"*, by J. L. Farrell, J. H. Minns and A. Sorrell, IEEE Transactions on Aerospace and Electronic Systems, Vol. AES-9, No. 5 (September 1973).

The next processing step is performed by a presum routine 72 of the motion compensated received signal on the line 70 to create signal information that can be processed to form the image. Presuming reduces the computational burden of SAR processing by narrow band filtering the azimuth samples (pulses) and reducing the sampling rate. This filtering may be performed by weighting the received signals on the line 70. Presumming is well known and discussed in *"Synthetic Aperture Processing With Limited Storage and Presumming"* by W. M. Brown, G. G. Houser and R. E. Jenkins; IEEE Transactions on Aerospace and Electronic Systems, Vol. AES-9, No. 2 (March 1973). Also see *"A Discussion of Digital Signal Processing in Synthetic Aperture Radar"* by J. C. Kirk, Jr., IEEE Transactions on Aerospace and Electronic Systems, Vol. AES-11, No. 3 (May 1975). In general, presumming is used to reduce the amount of data that is stored in main memory since the Doppler bandwidth of the system may be larger than what is actually necessary to image the stationary objects in the SAR scene 24 (FIG. 1). Therefore, only the Doppler band associated with stationary objects is retained for further processing.

Next, a polar reformat routine 76 receives pre-summed data on a line 74 to correct for the distortion of the scatterer's (i.e., an RF reflective surface) position about the center of the SAR scene (often referred to as the map center). A block of reformatted data is provided on a line 78 to subroutine 80 which corrects the reformatted data for fine range slip error which occurs due to the fact the INS is not infinitely accurate. The fine range slip correction value is adaptively computed by the subroutine and applied to prevent range walk by placing all the energy from the same scatter in the same range resolution cell. Range walk is the result of the stationary object "walking" through one or more range resolution cells during the dwell time. The fine range slip correction subroutine 80 then provides a corrected signal on a line 82 to an autofocus subroutine 84 that focuses the image of the stationary objects in the SAR scene. Subroutine 86 then forms the image of the stationary objects in the SAR scene that is enhanced by a brightness transfer subroutine (BTF) 88 that provides a SAR image signal on a line 90. The SAR image signal contains displayable quality images of the stationary objects (i.e., buildings, terrain and parked vehicles) in the SAR scene.

In conventional SAR processing the image is generally formed using a two dimensional Fast Fourier Transform (i.e., a 2-D FFT). One drawback, however, to using the FFT is inherent limitations on resolving more than one scatterer within a resolution cell. The ability to resolve scatterers is limited by the number of data samples available. Further, the undesirable side effect of side lobes that result from performing the FFT on a finite number of data samples can also affect the ability to the resolve of scatterers. Typically, it is sought to suppress these side lobes. One technique that has been used to reduce the presence of side lobes is the windowing of the data signal before performing the FFT. This, however, increases the main lobe width, which further reduces the ability to resolve closely spaced scatterers. Thus, a problem with conventional SAR processing is the difficultly of resolving more than one scatterer within a resolution cell.

There has, therefore, been research into a number of so-called superresolution techniques for forming images. These are called superresolution because they resolve beyond the inherent Fourier resolution limits of the data. The minimum variance techniques derived from Capon's minimum-variance technique (called MLM, or Maximum Likelihood Method) are one such group of superresolution techniques. Minimum variance techniques entail the derivation of a unique set of weighting coefficients to estimate the radar cross section (RCS), or energy density, at each output pixel. The weighting coefficients replace the FFT used in conventional SAR image formation. Essentially, these techniques seek to minimize the power from additive noise (which is known to be given by its covariance), while keeping unit gain for the signals sought. That is, $$I(r,c) = \min \omega^H R \omega \quad (3)$$

such that $$\omega^H v(r,c) = 1,$$

where I(r,c) is the output image at location range r and cross-range c, ω is a vector of the weighting coefficients (i.e., beam forming or combining coefficients) which are applied to the covariance matrix R (also known as the autocorrelation matrix) of the data, and v(r,c) is the steering vector for a point scatterer at the location (r,c). A steering vector, v(r,c), is an idealized point scatterer response. That is, if an ideal point scatterer is located at only one of the pixels, then a response is provided that is the steering vector for that scatterer within a scaling factor and an overall phase constant. H is the complex conjugate transpose (also referred to as a Hermetian). $R = xx^H$, where x is a vector of the data samples.

As described, the additive noise sought to be minimized is given by its covariance. Therefore, the accuracy of any minimum-variance algorithm depends on the accuracy of the covariance estimate. Further, many minimum-variance techniques require a full rank covariance matrix. With only one phase history observation, however, the covariance matrix is rank deficient. Therefore, in most specific cases, the covariance estimate of the data samples is improved by using multiple looks. Looks are different realizations of the same data. In this case, $$R = \frac{1}{K} \sum_{k=1}^{K} x_k x_k^H$$

where $x_k$ is a look vector.

As shown in equation (3), a minimum-variance technique computes a solution for ω that minimizes the power, or energy, or RCS at this one given pixel of interest for a given model. That is, the output image at one given pixel (i.e., r, c) is computed by using weights ω that minimize the product $\omega^H R \omega$.

One solution that minimizes $\omega^H R \omega$ is ω=0. However, this is an unacceptable solution since there would be no image left. Therefore, possible solutions must be further constrained. Therefore, what generally differentiates various minimum variance techniques are the constraints imposed and/or assumptions made about the covariance matrix.

One constrained minimum variance technique is the so-called High-Definition Vector Imaging (HDVI), which is describe in U.S. patent application Ser. No. 09/025,994, entitled "High-Definition Imaging Apparatus and Method," and filed on Feb. 19, 1998, incorporated herein by reference. In HDVI, the weights ω are further constrained in norm $\|\omega\| \leq \beta$ to reduce the loss of sensitivity to bright scatters. The weights ω are also constrained to a particular subspace in order to preserve background information in the image. This constraint is accomplished by confining the selection of the weighting vector ω to the subspace defined by the linear space of the columns of the covariance matrix generated from the data. HDVI provides dramatic sidelobe cancellation along with significantly improved resolution (i.e., narrower main lobes).

Unfortunately, even though improvements in image quality for human exploitation with HDVI are evident, they have not been implemented due to the computational cost. The computational cost of HDVI, specifically the constrained-weight minimum-variance technique is approximately 8000 real operations (e.g., one real-valued multiply-and-accumulate is counted as two operations) per input pixel. The resultant image is upsampled by a factor of two, in both range and cross-range, to account for the narrower point response. The major computational burdens are the generation of the covariance matrix (frequency-domain autocorrelation), the eigen-decomposition of this matrix, and the imaging of the resultant eigenvectors for every output pixel.

There is therefore a need for a minimum variance technique for sensor data processing that provides the benefits of HDVI at a reduced computational burden.

SUMMARY OF THE INVENTION

In one aspect of the present invention, a method of processing image data to produce a high-definition image is provided. The image data is received and adaptively processed using a constrained minimum variance method to iteratively compute the high-definition image. The high-definition image I is expressed in range and cross-range as $I(r,c) = \min \omega^H R \omega$, where ω is a weighting vector and R is a covariance matrix of the image data. A solution for I(r,c) is approximated by i) forming $Y = [x_1 \ldots x_K]^T/\sqrt{K}$, where $x_1 \ldots x_K$ are beamspace looks formed from image domain looks and with $y_1$, $y_2$, and $y_3$ denoting the K×1 columns of Y; ii) computing $r_{21} = y_2^T y_1$ and $r_{31} = y_3^T y_1$, and $b = r_{21} y_2 + r_{31} y_3$; computing γ as $$\gamma = \min\left(\frac{r_{21}^2 + r_{31}^2}{b^T b}, \sqrt{\frac{\beta - 1}{r_{21}^2 + r_{31}^2}}\right);$$

and iii) computing I(r,c) as I(r,c)=$\|y_1 - \gamma b\|^2$.

In another aspect of the present invention, a system for processing image data to produce a high-definition image is provided. The system includes a preprocessing routine, a make beamspace looks routine, and a minimum variance method routine. The peprocessing routine receives the image data and generates a plurality of image domain looks. The make beamspace looks routine then generates k beamspace looks, $x_1 \ldots x_k$, from the plurality of image domain looks. The minimum variance method routine then iteratively computes the high-definition image from the beamspace looks, wherein the high-definition image I is expressed in range and cross-range as I(r,c)=min$\omega^H R \omega$, where $\omega$ is a weighting vector and R is a covariance matrix of the image data. The minimum variance method routine approximates a solution for I(r,c) by i) forming Y=[$x_1 \ldots x_K$]$^T/\sqrt{K}$ with $y_1$, $y_2$, and $y_3$ denoting the K×1 columns of Y; ii) computing $r_{21}=y_2^T y_1$ and $r_{31}=y_3^T y_1$, and $b=r_{21}y_2+r_{31}y_3$; computing $\gamma$ as $$\gamma = \min\left(\frac{r_{21}^2 + r_{31}^2}{b^T b}, \sqrt{\frac{\beta - 1}{r_{21}^2 + r_{31}^2}}\right);$$

and iii) computing I(r,c) as I(r,c)=$\|y_1 - \gamma b\|^2$.

In another aspect of the present invention, the high-definition image is combined with unweighted and Taylor-weighted images to provide a more detailed image.

These and other features and advantages of the present invention will become apparent in light of the following detailed description and accompanying drawings.

DETAILED DESCRIPTION OF THE INVENTION

The beamspace high-definition imaging (B-HDI) system and method of the present invention is an application of minimum-variance processing that provides reductions in the main lobe, sidelobes and speckle similar to HDVI, but with a substantial reduction in the number of computations. To achieve significant reduction in operations, the minimum-variance algorithm is reformulated in the image domain, in contrast to the frequency-domain implementation of HDVI. Thus, operations are performed for each output pixel using only local correlations, thereby keeping the dimension of the problem low. This, in addition to an approximation of the minimum variance method, reduces computational intensity.

Figure 4:
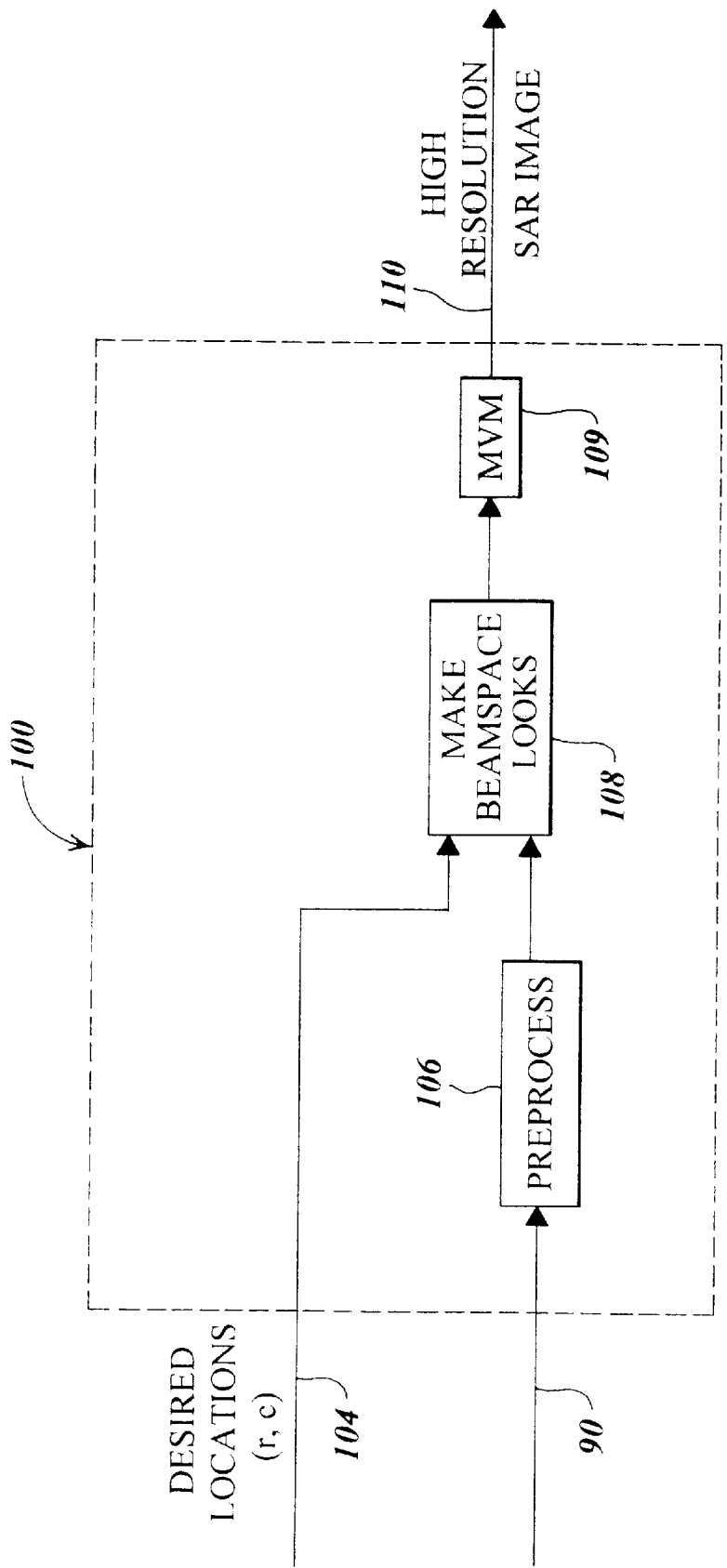
FIG. 4 is a functional block diagram of the processing of the present invention.

FIG. 4 illustrates a functional block diagram of a beamspace high-definition imaging (B-HDI) system 100 of the present invention, which receives SAR image data and adaptively processes the image the data to provide a high resolution SAR image. The present invention shall be discussed in the context of an off-line (i.e., not real-time) processing system that receives image data from a SAR and reprocesses the image data to form a high-definition image. However, it is contemplated that the present invention may also be adapted for use in a real-time SAR imaging system.

Figure 1:
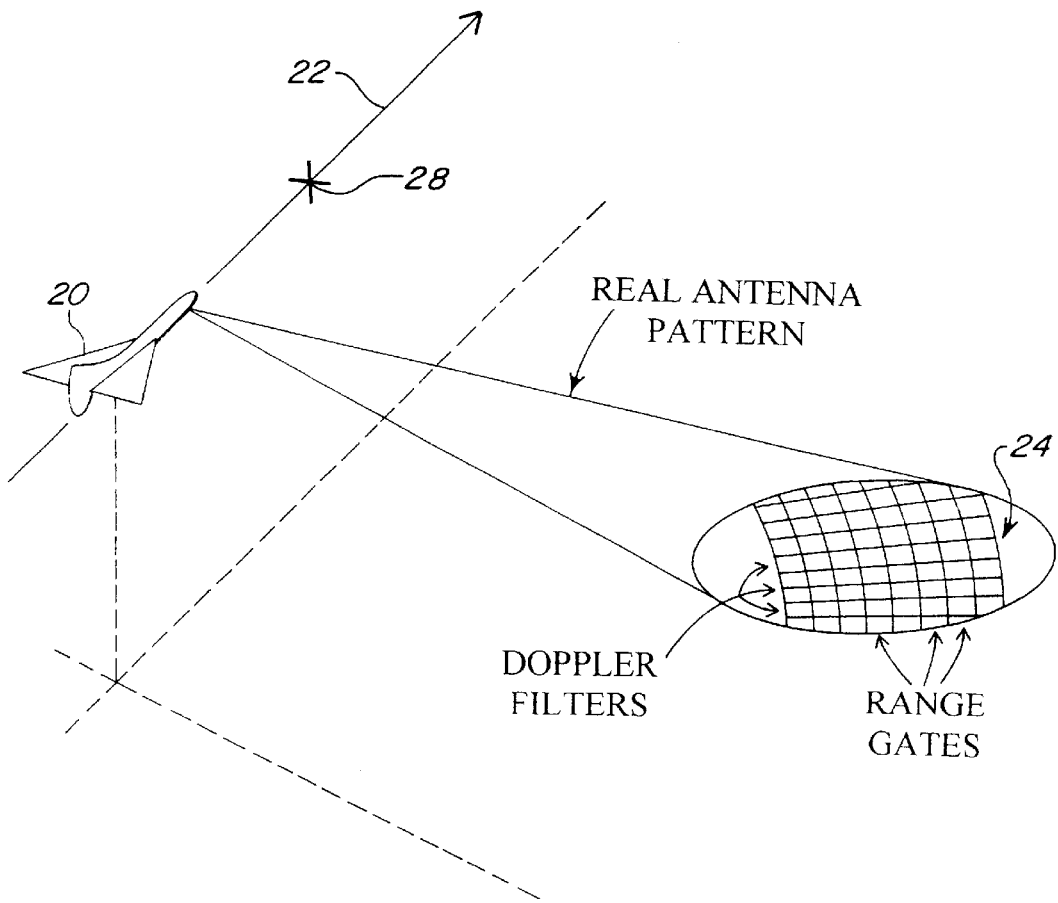
FIG. 1 is a pictorial illustration of a SAR equipped aircraft illuminating a SAR scene.
Figure 2:
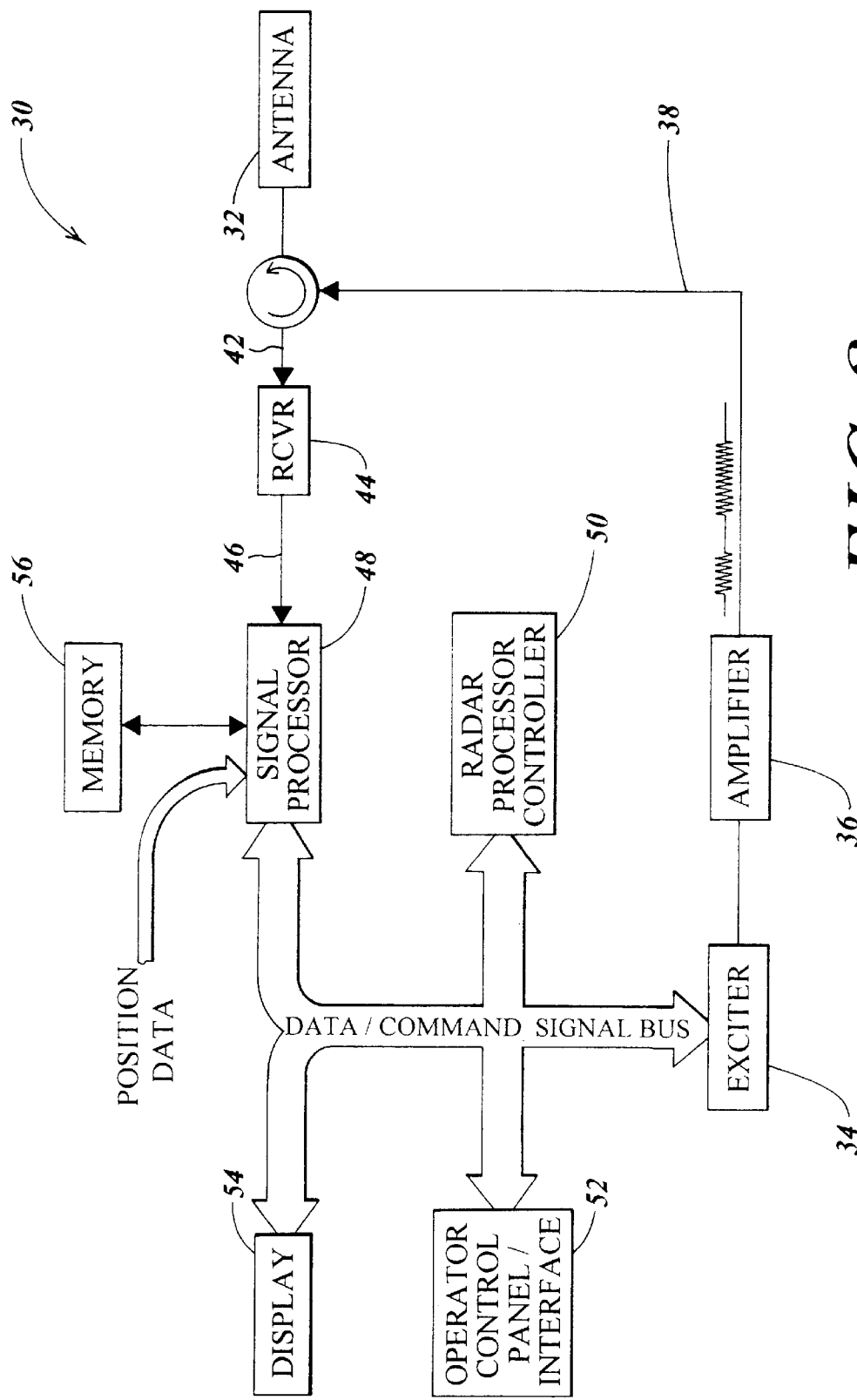
FIG. 2 illustrates a functional hardware block diagram illustration of a SAR.
Figure 3:
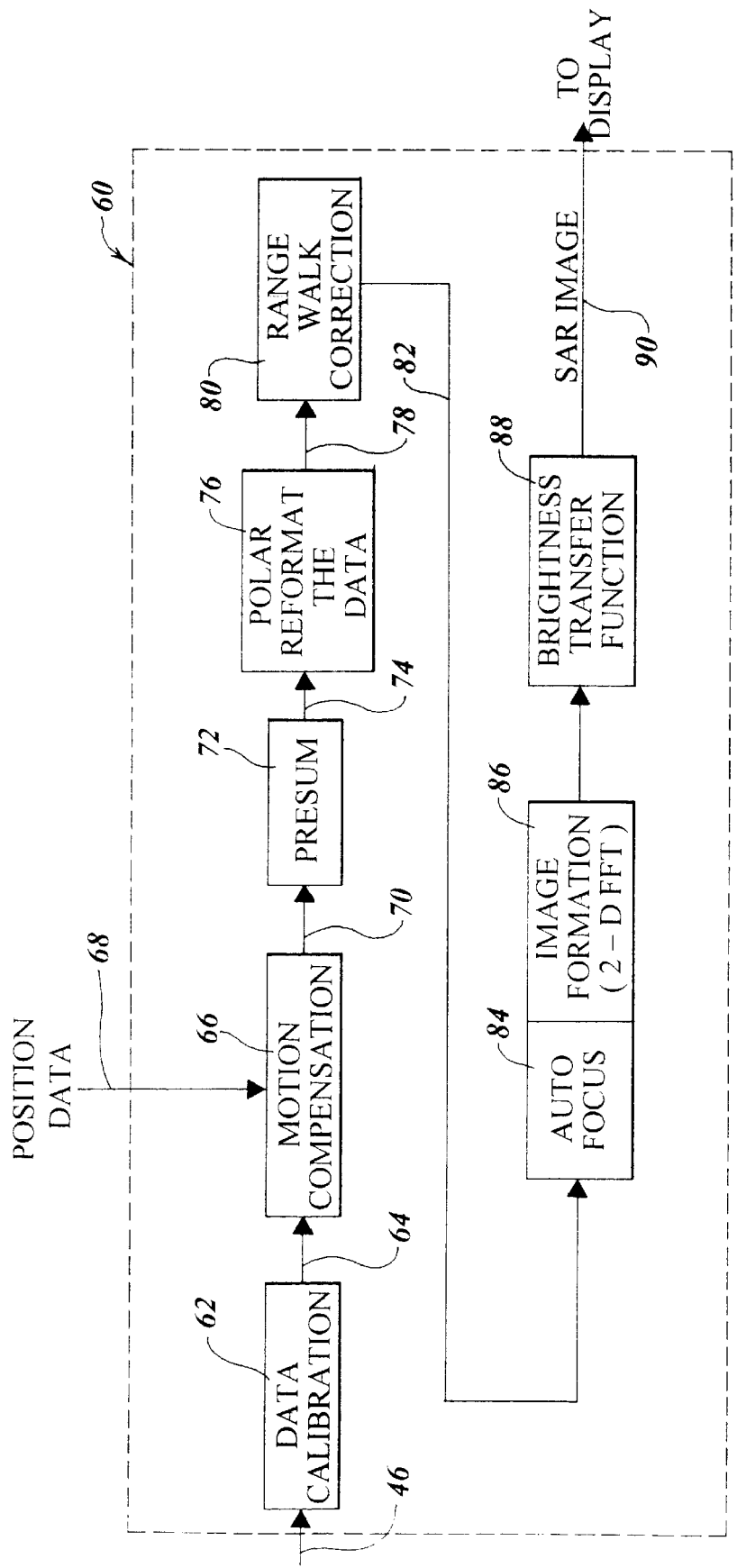
FIG. 3 illustrates a functional block diagram illustration of prior art SAR system processing.

The system 100 receives radar data in the spatial domain on the line 90 from the SAR image formation output of block 86 in FIG. 3. The system also receives desired range r and cross range c information on a line 104. The radar image on the line 90 is a matrix having amplitude and phase information from each pixel (e.g., $A_{11}e^{j\Phi_{11}}$). The radar image matrix is input to a preprocessing routine 106, which creates multiple looks in the frequency domain and recasts each of these looks into the image domain. These image domain looks are provided to beamspace looks routine 108 that creates multiple beamspace looks for the desired pixel, i.e. desired range r and cross range c. The beamspace looks are provided to a constrained minimum variance method (MVM) routine 109. The MVM routine 109 is an adaptive processing technique that determines an intensity profile for the desired pixel from the multiple beamspace looks. Processing each range and cross range position provides a matrix of radar cross section data, or energy density, as a function of location (range and cross-range). The present invention accounts for the presence of multiple scatters within a range-cross-range cell and adjusts the radar cross section accordingly.

Each of the routines 106–109 includes executable software to provide the high-definition imaging of the present invention. The details of the three routines 106–109, which comprise the beamspace high-definition imaging system 100, shall now be discussed in detail.

Figure 5:
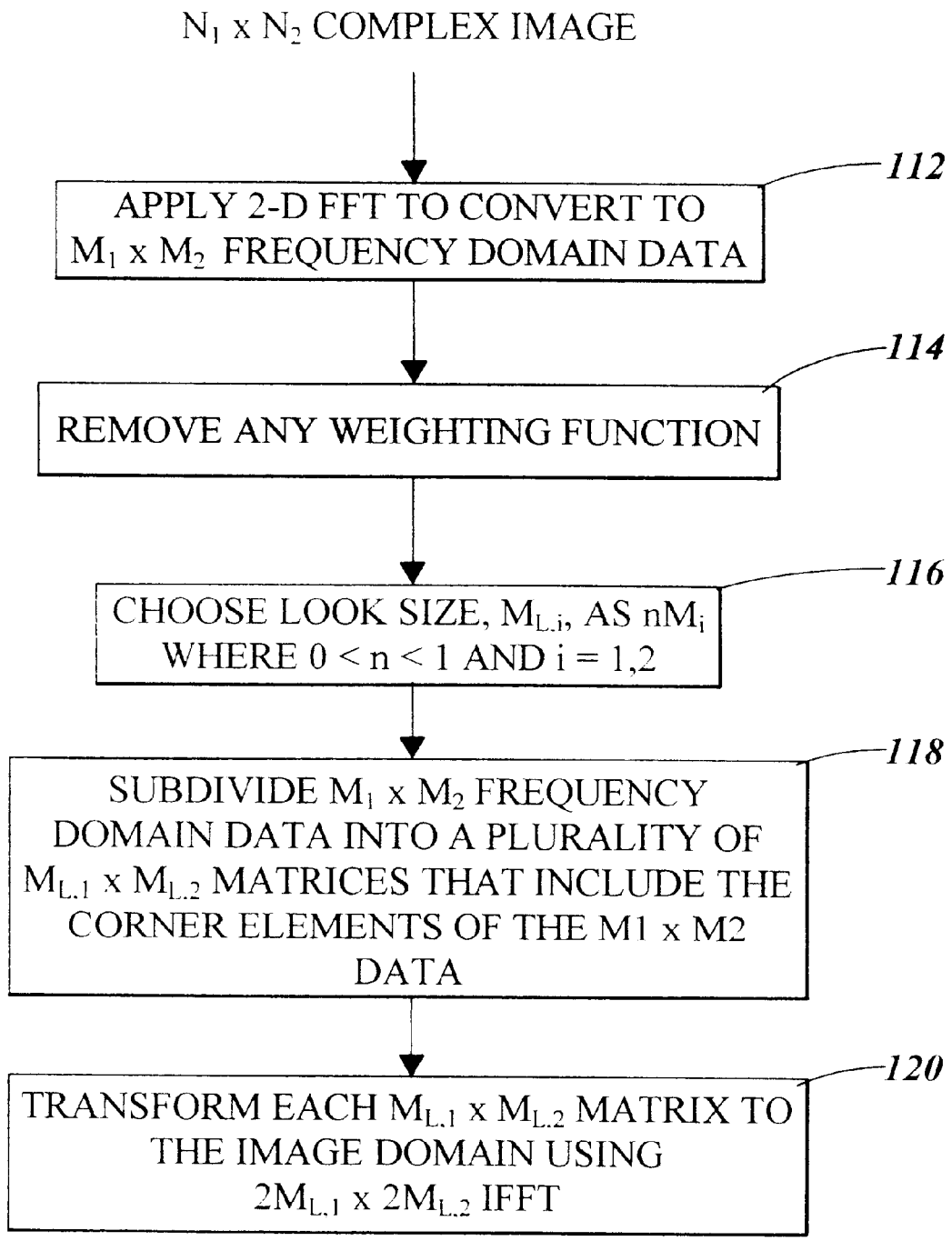
FIG. 5 is a flow chart illustration of the preprocessing routine shown in FIG. 4.

FIG. 5 illustrates the processing steps of the preprocessing routine 106, which generates multiple image domain looks from which beamspace looks are generated. As will be seen, the preferred B-HDI covariance matrix is of dimension 3×3, and hence at least three beamspace looks are needed to prevent degeneracy. Preferably, more than six beamspace looks are used to provide accuracy. While many beamspace looks are desirable for accuracy, it should be noted however, that in the SAR application, looks come at the expense of resolution, target-to-clutter ratio, and increased operations.

Although B-HDI is formulated in the image domain, the looks that are used to form beamspace looks are first derived in the frequency domain. These looks are generated as subsets of the full data. Preferably, these looks are generated as four subsets of the fall data that include the corner elements of the full data. These subsets are then imaged via 2-D inverse FFTs to provide the image-domain looks, which are used to form beamspace looks.

As shown in FIG. 5, assuming an $N_1 \times N_2$ complex-valued image having equal resolutions in each dimension is input to preprocessing routine 106, step 112 applies a 2-D FFT, shifting as necessary, to convert the complex-valued image data into $M_1 \times M_2$ frequency-domain data. Step 114 removes any windowing or weighting function, e.g. Taylor or Hamming, previously applied to the data. In step 116, a look size, $M_{L,i}$, is chosen as an integer near $nM_i$, where $0 < n < 1$, and $i = 1, 2$. Preferably, $n = 0.8$. Step 118 then generates looks as a plurality of $M_{L,1} \times M_{L,2}$ subsets of the $M_1 \times M_2$ data. Preferably, the looks are generated as the four $M_{L,1} \times M_{L,2}$ subsets containing the corner elements of the $M_1 \times M_2$ data. Therefore, the looks are preferably generated as the four 80%×80% subsets of the full data that include the corner elements of the fall data. At step 120, the looks are transformed to the image domain using $2M_{L,1} \times 2M_{L,2}$ inverse FFTs (IFFT), packing the data such that it is centered about zero frequency. This packing guarantees that the sidelobes have no phase shift with respect to the main lobe. Specifically, let $[\alpha_{m,n}]$ denote an $M_{L,1} \times M_{L,2}$ frequency domain look, and $\tilde{z}_{r,c}$ the image domain look. Then, ignoring scaling, each image domain look is:

$$\tilde{z}_{r,c} = \sum_{m=-\frac{M_{L,1}}{2}+1}^{\frac{M_{L,1}}{2}} \sum_{n=-\frac{M_{L,2}}{2}+1}^{\frac{M_{L,2}}{2}} a_{m+\frac{M_{L,1}}{2}, n+\frac{M_{L,2}}{2}} \cdot e^{j2\pi(m-1)(n-1)\frac{r-1}{2M_{L,1}}\frac{c-1}{2M_{L,2}}},$$

$$r = 1, \ldots, 2M_{L,1}, \; c = 1, \ldots, 2M_{L,2}.$$

Referring again to FIG. 4, the next processing step is the make beamspace looks routine 108. Functionally, this routine receives the image domain looks and creates a plurality of beamspace looks for the desired pixel. The beamspace looks are formed using the desired pixel and its immediately adjacent pixels. Notably, the term beamspace refers to the analogy between a pixel in the SAR image and an electronically steered beam in an adaptive array. Here, the use of the desired pixel and its adjacent pixels (as contrasted to the 12×12 region in HDVI) is analogous to the selection of a few beams for processing.

Thus, B-HDI is formulated for a 3×3 set of image pixels, $\{z_{ij}, i=-1,0,1, j=-1,0,1\}$, where $z_{0,0}$ is the center pixel, i.e. the desired pixel under test:

$$\begin{bmatrix} z_{-1,-1} & z_{-1,0} & z_{-1,1} \\ z_{0,-1} & z_{0,0} & z_{0,1} \\ z_{1,-1} & z_{1,0} & z_{1,1} \end{bmatrix}$$

Note that this is a reduction in spatial degrees of freedom as compared to HDVI, the latter being formulated for a 12×12 region. Degrees of freedom are further reduced by forming the "beams," i.e. pre-summing the pixels according to their distance from center, for each image domain look. Let $x_k$ denote a 3×1 vector of beams $$x_k = \begin{pmatrix} z_{0,0} \\ z_{-1,0} + z_{1,0} + z_{0,-1} + z_{0,1} \\ z_{-1,-1} + z_{-1,1} + z_{1,-1} + z_{1,1} \end{pmatrix}_k = \begin{pmatrix} \text{center pixel} \\ \text{sum of adjacent pixels} \\ \text{sum of corner pixels} \end{pmatrix} \quad (4)$$

where k denotes the look index. Thus, beamspace looks are formed for the desired pixel using equation (4) and each image domain look. Further, forward-backward averaging is performed during the formation of the beamspace looks to increase the number of beamspace looks. While these beamspace looks are not truly independent, they improve the conditioning of the covariance matrix. The forward-backward averaging is achieved by taking the complex conjugate of the image-domain looks. Because real and imaginary parts are simply a unitary transformation of conjugate pairs (within a scale factor), looks are simply taken as the real and imaginary parts of the complex images.

Thus, to form the beamspace looks, beams are formed as in equation (4), noting that $\tilde{z}$ is doubly oversampled and complex-valued. That is, $z_{i,j} = \Re\{\tilde{z}_{r+2i,c+2j}\}$, $i,j=-1,0,1$ is used to generate one beamspace look according to equation (4), then $z_{i,j} = \Im\{\tilde{z}_{r+2i,c+2j}\}$, $i,j=-1,0,1$ is used to generate another beamspace look, where $\Re$ and $\Im$ denote the real and imaginary parts, respectively. This is repeated for each image domain look. The result is eight beamspace looks, $x_k$, $k=1, \ldots, 8$, for pixel (r,c) in the output image.

The beamspace looks are then provided to MVM routine 109 (FIG. 4), which, as previously described, is an adaptive processing technique that determines an intensity profile for the desired pixel from the multiple beamspace looks. Before discussing the processing steps of the efficient implementation of the constrained MVM routine 109, a brief discussion of the general form of the solution is provided.

Note that the $z_{i,j}$ are formed such that that the response of a point-scatterer located at (0,0) is $x_k [100]^T$, $\forall k$. (In general, the response for a point-scatterer at $(r_0, c_0)$ is approximately $z_{r,c}$ sinc$(r-r_0)$ sinc$(c-c_0)$, where sinc$(r) \equiv \sin(\pi r)/\pi r$) That is, for the $z_{ij}$ formed in beamspace looks routine 108, the point response is a 2-D sinc function with unit spacing of zeros, and a scatterer located exactly at (r,c) will contribute nothing to elements two and three of $x_k$.

Further, the covariance matrix is:

$$\hat{R} = \frac{1}{K} \sum_{k=1}^{K} x_k x_k^H \quad (5)$$

Therefore, according to the present invention, the general form of the solution for the intensity profile, I(r,c), of the image at the desired location range r and cross-range c is expressed as:

$$I(r,c) = \min_{[100] \cdot \omega = 1} \omega^H \hat{R} \omega \quad (6)$$

$$\omega^H \omega \leq \beta$$

where $\omega$ is the 3×1 beamforming vector (weights), [1 0 0] is the point response to be preserved (the steering vector), and $\beta$ is the constraint on the norm of $\omega$. The exact solution is $\omega (\hat{R} + \alpha I)^{-1} \cdot [100]^T$, where the amount of diagonal loading, $\alpha$, is chosen to satisfy the norm constraint $\beta$ (I is the 3×3 identity matrix). This exact solution, however, is computationally expensive and an approximation is employed as discussed next.

Figure 6:
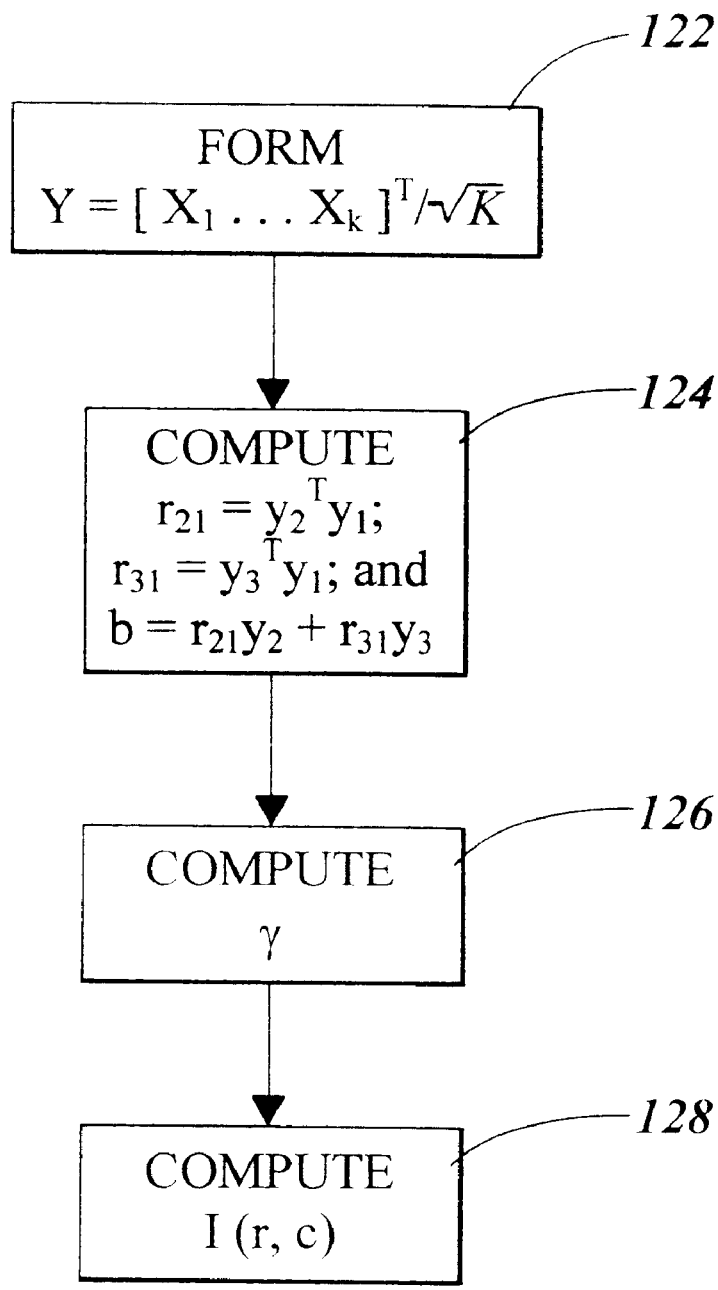
FIG. 6 is a flow chart illustration of the processing of the make beamspace looks routine as shown in FIG. 4.

FIG. 6 is a flow chart illustration of constrained MVM routine 109. Two simplifications provide for an efficient implementation and to further reduce the computational intensity. These are 1) transformation to real arithmetic, and 2) approximation of the minimization of equation (6). Transformation to real arithmetic is a by-product of the use of forward-backward averaging in the formation of beamspace looks, which entails taking the real and imaginary parts of each image domain look to form separate beamspace looks.

The approximation of equation (6) is as follows. Denoting the elements of $\hat{R}$ as $\{r_{ij}, i=1,2,3, j=1,2,3\}$, the weight vector $\omega$ can be written as $$\omega = \begin{pmatrix} 1 \\ [r_{23}r_{31} - r_{21}(r_{33} + \alpha)]/[(r_{22} + \alpha)(r_{33} + \alpha) - r_{23}r_{32}] \\ [r_{21}r_{32} - r_{31}(r_{22} + \alpha)]/[(r_{22} + \alpha)(r_{33} + \alpha) - r_{23}r_{32}] \end{pmatrix} \propto (\hat{R} + \alpha I)^{-1} \begin{pmatrix} 1 \\ 0 \\ 0 \end{pmatrix}$$

where $\alpha$ is chosen to satisfy the norm constraint on $\omega$. The approximation employed arises from the form of $\omega$ for large $\alpha$:

$$\omega \cong \begin{pmatrix} 1 \\ -r_{21}\gamma \\ -r_{31}\gamma \end{pmatrix} \quad (7)$$

for some $\gamma \geq 0$ that satisfies the norm constraint and further conditions described below.

This form for $\omega$ is used instead of another, e.g. the $\alpha=0$ solution, because the functional goal of the minimum-variance beamformer in B-HDI is to reduce contributions due to strong nearby scatterers. In the case of a strong nearby scatterer, the minimization in (6) usually achieves equality in the norm constraint, and the corresponding value of $\alpha$ becomes large, even to the point of exceeding the diagonal values of $\hat{R}$. Furthermore, observations indicate that the difference between the exact and approximate solutions is negligible in the final image; but the computational savings are significant.

Let $Y=[x_1 \ldots x_K]^T/\sqrt{K}$ denote a K×3 matrix of scaled beamspace looks (real-valued), and let $y_1$, $y_2$, and $y_3$ denote the K×1 columns of Y. Considering the minimization in (6) with the additional constraint on $\omega$ in (7), then it follows from equation (5) that $\hat{R}=Y^TY$, and that (6) becomes:

$$I(r,c) = \min_{\substack{\omega \text{ as in } (7) \\ (r_{21}^2+r_{31}^2)\gamma^2 \leq \beta-1}} \|Y\omega\|^2.$$

Given that $r_{21}=y_2^Ty_1$ and $r_{31}=y_3^Ty_1$, and defining $b=r_{21}y_2+r_{31}y_3$, then $$\|Y\omega\|^2=\|y_1-\gamma b\|^2 \quad (8)$$

which achieves its minimum at $\gamma=b^Ty_1/b^Tb$. Applying the norm constraint gives the following solution for $\gamma$, $$\gamma = \min\left(\frac{r_{21}^2+r_{31}^2}{b^Tb}, \sqrt{\frac{\beta-1}{r_{21}^2+r_{31}^2}}\right). \quad (9)$$

Substituting (9) into (8) provides the minimum-variance solution.

This simplification lessens computations in two ways, first by avoiding the search for the diagonal-loading coefficient $\alpha$, and second by avoiding the calculation of several covariance terms. This provides a considerable computational savings with little degradation in the resultant image.

In summary, as illustrated in FIG. 6, the MVM routine 109 is as follows. Given beamspace looks $[x_k, k=1, \ldots, K]$ as in equation (4) from make beamspace looks routine 108, and a norm constraint $\beta>1$, then step 122 forms $Y=[x_1 \ldots x_K]^T/\sqrt{K}$, with $y_1$, $y_2$, and $y_3$ denoting the K×1 columns of Y. Step 124 computes $r_{21}=y_2^Ty_1$ and $r_{31}=y_3^Ty_1$, and $b=r_{21}y_2+r_{31}y_3$. Step 126 then computes $\gamma$ as in equation (9). Finally, at step 128, I(r,c), i.e. the minimum-variance output, is computed as in equation (8) using the computed $\gamma$.

The total cost of the procedures described above is about 1400 real operations per input pixel given a complex valued input image of size $N_1=N_2=256$, a frequency-domain support of size $M_1=M_2=228$ (12% zero fill), a look size of $M_{L,1}=M_{L,2}=180$, and a size-N FFT cost of 5 N $\log_2$ N operations. In contrast, the minimum variance routine (MLM) routine of HDVI costs 7830 operations per input pixel when producing a 4:1 oversampled output. Combination of HDVI with the conventional images as described below would raise the cost by 300–400. Hence the cost savings of B-HDI is about a factor of six.

A breakdown of the costs is as follows. The MVM routine 109 costs approximately 140 ops per output pixel, and thus 270 ops per input pixel due to the $(2M_L/N)^2$ upsampling. The preprocessing routine 106 and make beamspace looks routine 109 cost 580 ops per pixel, 80 of which are the initial $N_1 \times N_2$ FFT. The combination and resampling of image combining routine 212 cost 570 ops assuming that the sharpening and resampling are done with FFTs.

The efficiency of B-HDI allows for real-time application to entire scenes. Scenes could be chopped up into, e.g. 256×256, regions to conserve memory and maintain efficiency. Current image-formation techniques are on the order of 1000 operations per pixel, so that B-HDI requires only a doubling of the computation speed.

A more detailed image can be produced via combination with conventional images, even though the minimum-variance output alone may provide the desired result. The minimum-variance beamformer provides more accurate estimates of point-scatterer intensity than does a conventional image. Its visual display, however, it is somewhat lackluster due to the smoothing induced by the covariance formation, and some shadow detail can be lost due to the constraints on the weight vector. Both unweighted and Taylor-weighted conventional images reveal better detail in clutter and shadows; the unweighted image has a higher target-to-clutter ratio and the Taylor weighted image has deeper shadows. Combination of these three images results in an image possessing the best features of each.

Figure 7:
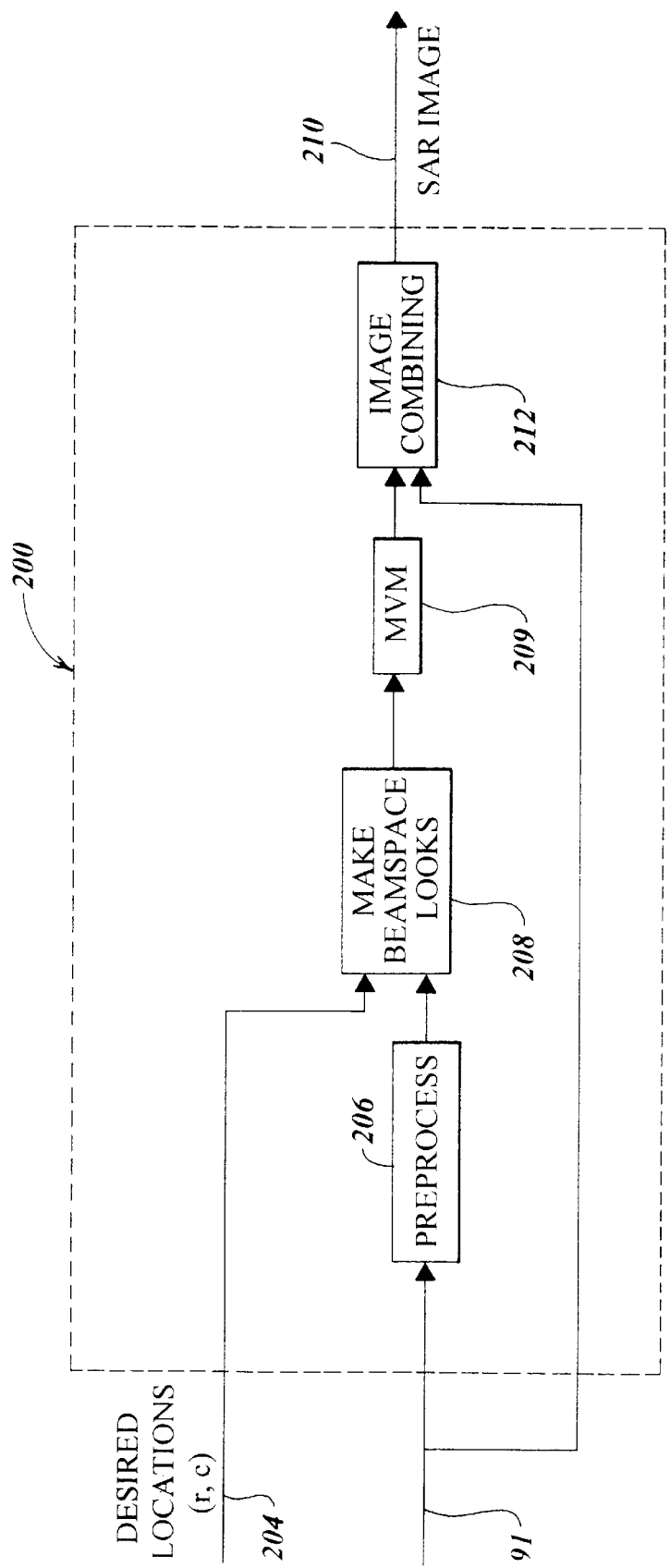
FIG. 7 is a functional block diagram of the processing of the present invention with image combining.

FIG. 7 illustrates a functional block diagram of a beamspace high-definition imaging system 200 according to the present invention that additionally combines a B-HDI image with conventional unweighted and Taylor weighted 2-D FFT images. Preprocessing routine 206, make beamspace looks routine 208, and MVM routine 209 operate the same as preprocessing routine 106, make beamspace looks routine 108, and MVM routine 109. Image combining routine 212 receives the output pixels from MVM routine 209 and the same radar data as is input on line 91. Image combining routine 212 generates the conventional images and combines them with the output image from MVM routine 209 to generate a sharper image. Each range and crossrange position is typically first processed to provide the full MVM image from MVM routine 209 to image combining routine 212. While the image combining routine is described as generating the conventional images, one of skill in the art will appreciate that the conventional images can be formed by other routines and input to image combining routine 212.

Generally, the combination is a pixel-by-pixel minimum of the images followed by a sharpening filter. The conventional images are first smoothed to reduce speckle. Speckle reduction is desired to eliminate zero crossings that would dominate the minimization process. For example, the increased speckle observed in SVA images, see H. C. Stankwitz, R. J. Dallaire, J. R. Fienup, "*Nonlinear apodization for sidelobe control in SAR imagery*," IEEE Trans. Aerospace and Electronic Systems, vol. 31, no. 1, pp. 267–279, January 1995, is the result of minimization of a continuum of non-speckle-reduced conventional images. The sharpening filter provides contrast enhancement and helps to undo some the smoothing caused by speckle reduction.

Figure 8:
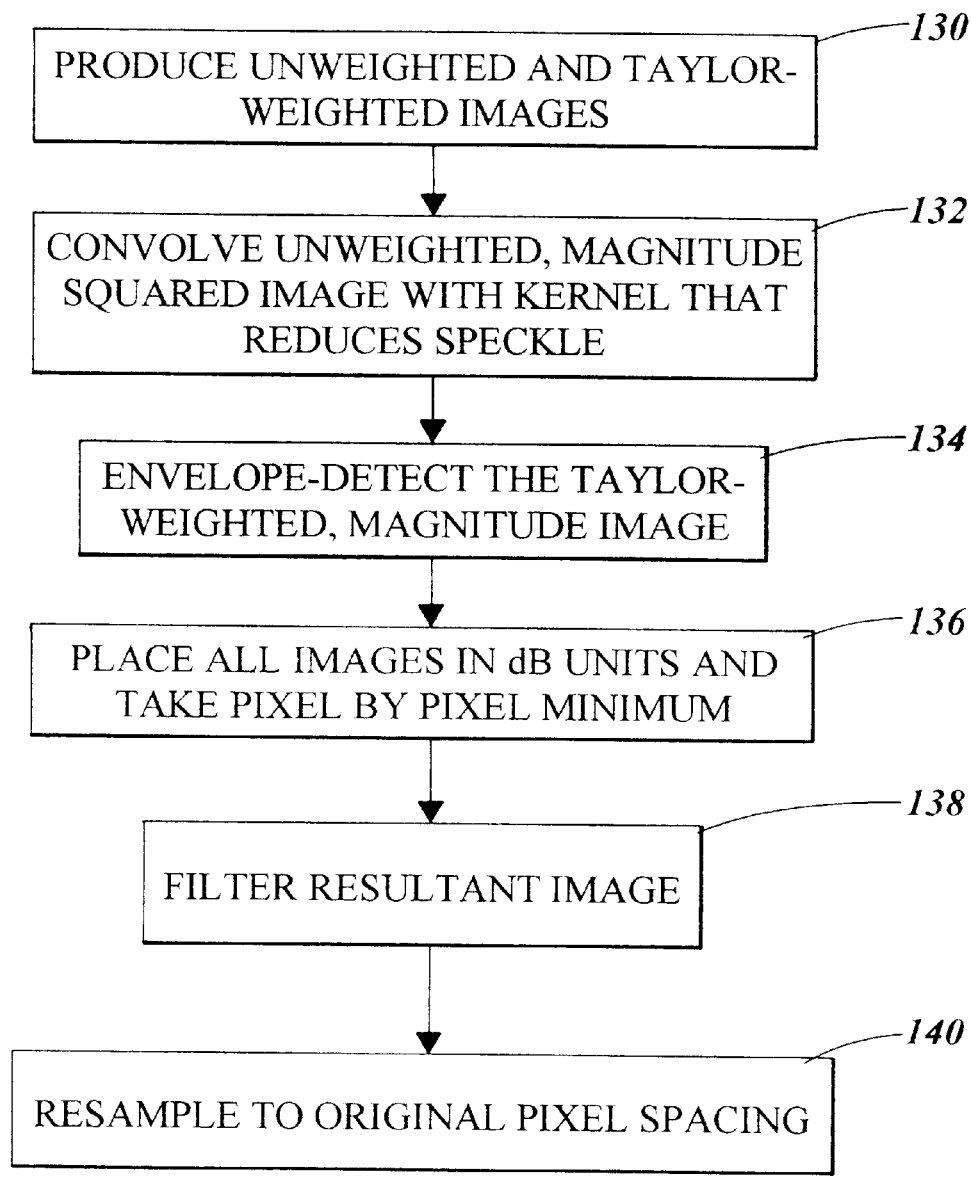
FIG. 8 is a flow chart illustration of the image combining routine shown in FIG. 7.

Specifically, image combining routine 212 performs the following steps, as shown in FIG. 8. At step 130, the unweighted and Taylor-weighted (35 dB, $5^{th}$-order) images are produced using the same size IFFT as in step 120 of make beamspace looks routine 208 to achieve registration of the pixels. The images are scaled so that an ideal point-scatterer has the same magnitude as the output image of MVM routine 209. The repacking described in step 120 is unnecessary because the image phase is discarded. At step 132 the unweighted, magnitude-squared image is convolved with a kernel that provides a speckle reduction similar to the minimum-variance algorithm and preserves the average (DC) level. Preferably, the kernel is the 3×3 kernel:

$$\begin{bmatrix} .011 & .033 & .011 \\ .033 & .824 & .033 \\ .011 & .033 & .011 \end{bmatrix}$$

The Taylor-weighted, magnitude image (not squared) is envelope-detected as follows at step 134. First, each pixel is replaced with the larger of itself and the average of the two bordering pixels in adjacent rows. Second, this step is repeated but the average of pixels in adjacent columns is used. It is important to apply the second step to the output of the first. Given a single to bright pixel (a delta function), this filter produces:

$$\begin{bmatrix} .25 & .5 & .25 \\ .5 & 1 & .5 \\ .25 & .5 & .25 \end{bmatrix}$$

At step 136, all three images are placed in dB units and the pixel-by-pixel minimum is taken. Next, the resultant dB-valued image is filtered. Preferably, it is filtered by convolving it with a 7×7 symmetric kernel derived according to the function:

$$0.73e^{-0.8r^2} - 0.073e^{-(r/3)^8}, \quad r^2 = (\Delta i)^2 + (\Delta j)^2$$

where $\Delta i$ and $\Delta j$ are the integer-step offsets from the center of the kernel. Note that the filter is scaled to provide unit DC gain. This filter provides high contrast for display; however, users may prefer other filters, or no filtering for minimal speckle. The filtered image is then resampled to the original pixel spacing at step 140. This can be accomplished using FFTs when the preferred filter in step 138 is used because the filter is low-pass. For efficiency, the resampling step 140 can be combined with step 138, applying the filter in the frequency domain.

The following results demonstrate the ability of B-HDI to provide a sharper image of targets and clutter, to increase the target-to-clutter ratio (TCR), and to improve resolution with respect to conventional SAR imagery. Included are figures of merit for resolution, TCR and speckle, and image examples demonstrating improved TCR and sharper targets and clutter.

The resolution improvement of B-HDI is readily apparent. First, the point-scatterer lobe width (also called IPR, the −3 dB image point response) of MVM routine 109 is 0.78 Nyquist pixels with norm constraint $\beta=1.58$ (or $\beta_{dB}=2.0$) (Nyquist pixels are critically sampled, e.g. the spacing of an FFT with no zero padding. For radar, Nyquist spacing is c/2 bandwidth). For comparison, 35 dB Taylor weighting exhibits an IPR of 1.19 Nyquist pixels, and uniform weighting (unweighted, or "sinc" IPR) is 0.89. Hence, B-HDI provides 65% of the Taylor IPR. For comparison, HDVI operates at 50–60% of the Taylor IPR. For $\beta=1.26=10^{1/10}$, B-HDI provides 72% of the Taylor IPR, and a shape very similar to the "sinc" IPR. This wider IPR is advantageous for target contrast in the visual displays. The lobe width of the sharpened image is not specified because it varies with SNR.

Figure 9A:
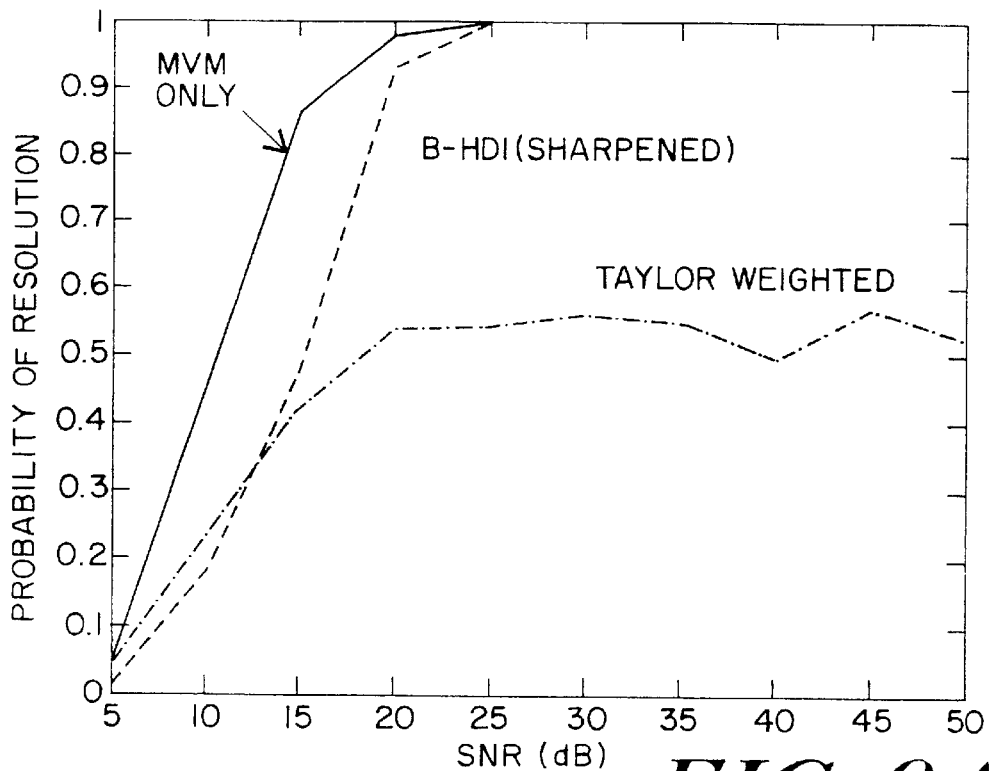
FIGS. 9a and 9b show plots of the probability of resolving two scatterers in noise.

Second, and more important than lobe widths, is the ability to resolve scatterers. To measure resolution, a simulation of two point scatterers in noise was performed at varying SNR (SNR indicates integrated SNR, i.e., in an unweighted image). Two-hundred trials with random scattering phases and random Gaussian noise resulted in the plots in FIGS. 9a and 9b. The plot in FIG. 9a is for a separation of 1.28 Nyquist pixels in range only, and equal SNR. The spacing was chosen as a two-pixel separation in the upsampled image of make beamspace looks routine 108. The plot in 9b is for a separation of 1.4 Nyquist pixels (1.28 in range and 0.64 in cross-range), and 6 dB difference in SNR. Resolution is defined as observing peaks at the true locations in the upsampled images (56% oversampled in both range and cross-range), an accuracy requirement of 0.32 Nyquist pixels. Note that this is not a test of super-resolution because the images are not sampled sufficiently for that. It is a test of practical resolution that reveals some serious shortcomings of conventional imagery.

Figure 9B:
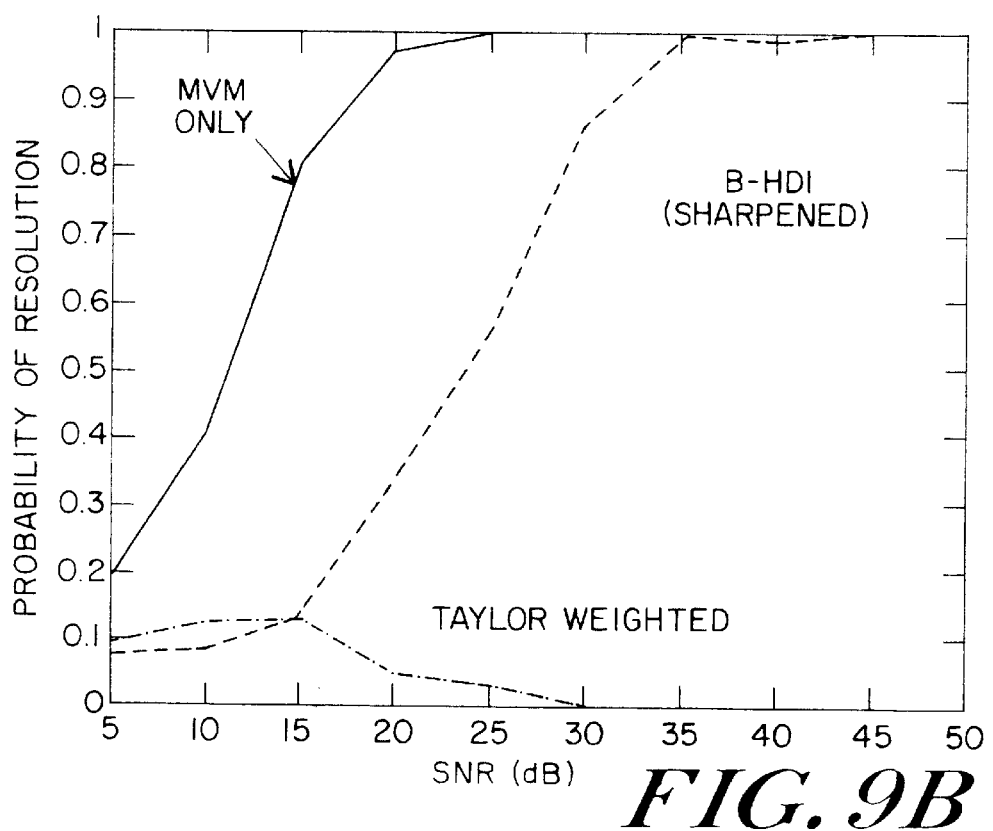

FIGS. 9a and 9b show the superiority of MVM routine 109 (using $\beta=1.58$) over the 35 dB Taylor-weighted conventional image. Even at 10 dB SNR, MVM resolves 45% of the time. It is surprising in FIG. 9a to observe the 40% failure rate of conventional imagery at high SNR, given that the separation is 7.5% wider than the −3 dB lobe width; and the total failure in FIG. 9b at 17.7% wider separation. The falling performance versus SNR of conventional imagery in FIG. 9(b) indicates that any perceived resolution is a random occurrence. The combined and sharpened image generated by image combining routine 212 has a loss of performance at lower SNR due to its smoothing of the image for decimation. Smoothing can be diminished if the image is not to be decimated to the original pixel spacing. However, the sharpened image still exceeds the conventional. Results in both cases using HDVI are about the same as B-HDI, an understandable result given the large separations and algorithmic similarities.

Figure 10:
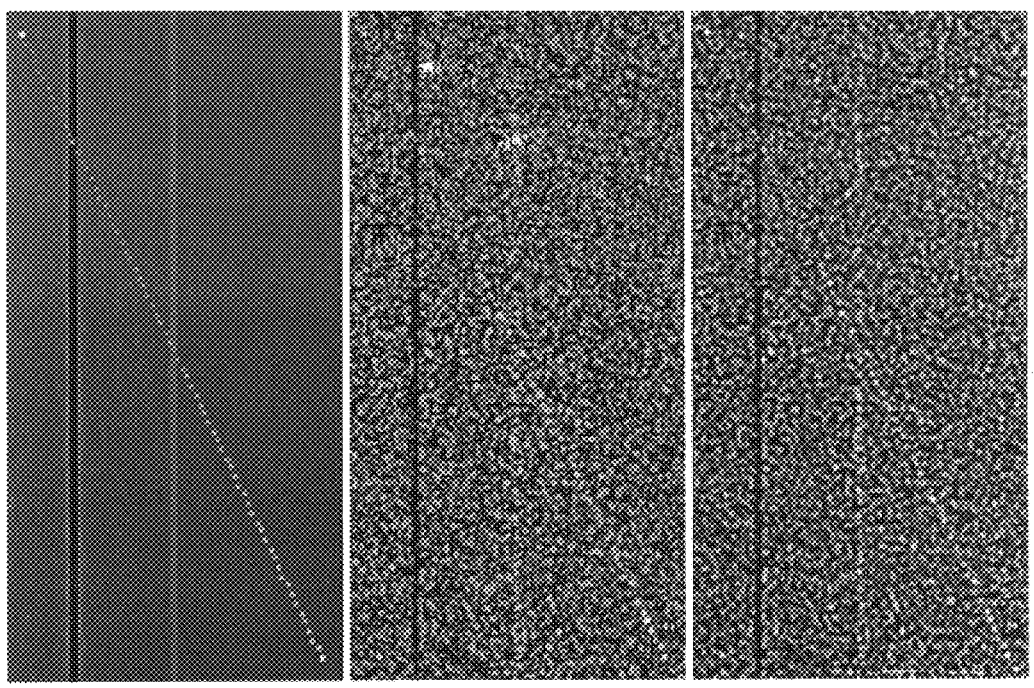
FIG. 10 shows SAR images of a test pattern containing Gaussian noise and point scatterers.

In addition to improving resolution, B-HDI using the image combining routine 212 increases TCR. This is a contribution of the unweighted image. An unweighted image has 1.85 dB higher TCR than a 35 dB Taylor-weighted image. It is estimated that B-HDI (using image combination) provides a TCR improvement somewhere between 1.0 and the 1.85 limit, based on the images shown in FIG. 10. The images in FIG. 10 are of a test pattern containing Gaussian noise and point scatterers. The first image is a sample test pattern of point scatterers in clutter. The middle image is the Taylor-weighted image of the test pattern. The last image is the B-HDI (β=1.26) image, using image combination, for the same test pattern. The noise has two vertical stripes, a 10 dB decrease of width 2.4 Nyquist pixels, and a 3 dB increase of width 2.0. There are 70 points running diagonally with SNR rising from 5 to 12 dB from top to bottom. The total image extent is 200×100 Nyquist pixels, displayed at 312× 156. Note how the B-HDI image exhibits a sharper notch in the noise, and provides better visibility of the points. With repeated examples, it is observed that the TCR in B-HDI matches the TCR of the Taylor image at 10 points or more down the diagonal. At 0.1 dB step per point, this is at least 1.0 dB better TCR.

B-HDI also exhibits less speckle than conventional imagery. Speckle can be quantified as the standard deviation of the dB-valued image for stationary complex Gaussian noise input. An unfiltered FFT image (including Taylor weighted) exhibits speckle of 5.6 dB. The B-HDI image in FIG. 10 exhibits 4.8 dB, and before the sharpening filter is applied, the speckle is 3.8 (3 dB. Without the image combining, the speckle is 3.7 dB.

Figure 11:
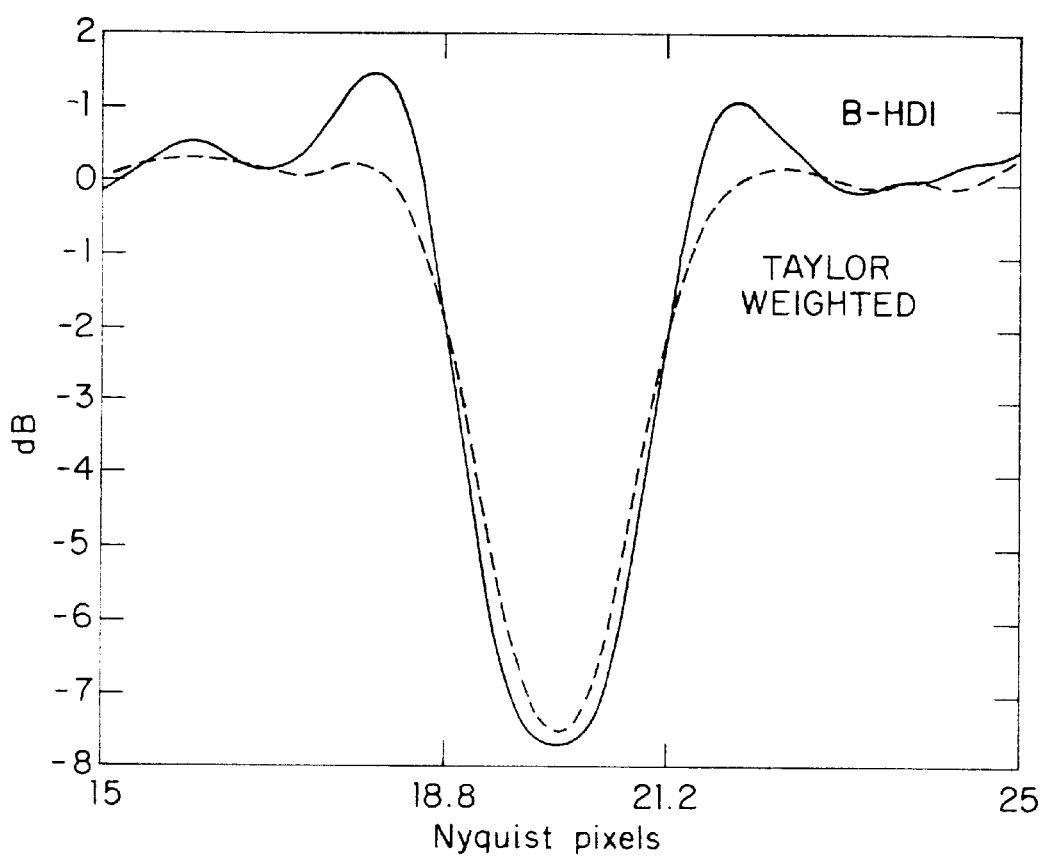
FIG. 11 is a plot of the average pixel level across the dark stripe in FIG. 10.

FIG. 11 is a plot of the average pixel level across the dark stripe in FIG. 10. The increased sharpness of the edges in B-HDI using image combining is due to the unweighted image and the sharpening filter. This ability to improve clutter detail is readily apparent in the imagery examples of FIG. 12.

Figure 12A:
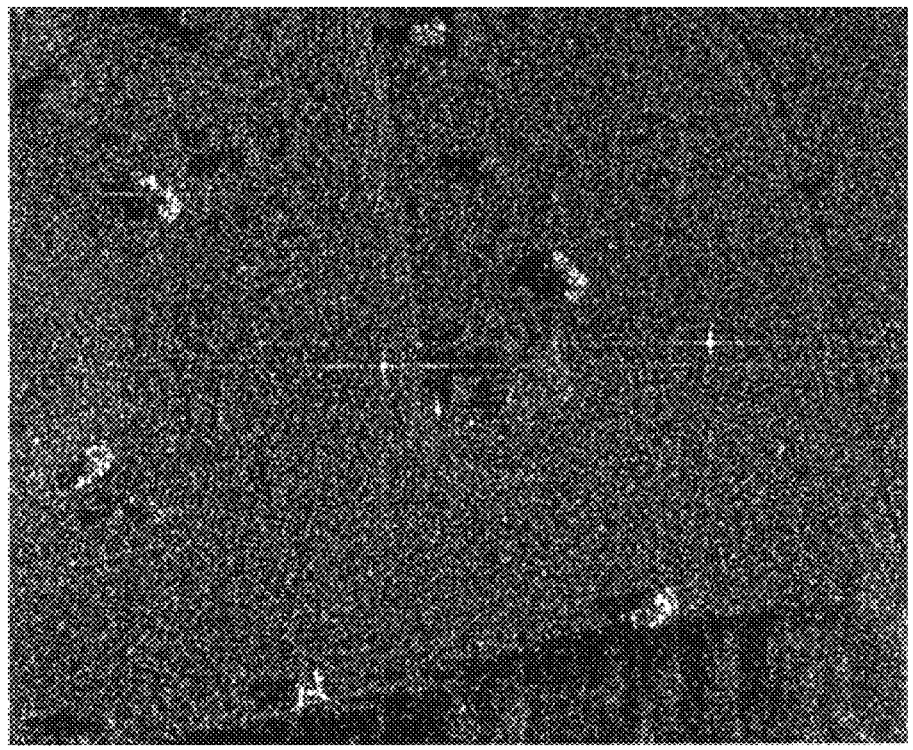
FIGS. 12a and 12b show a comparison of Taylor-weighted conventional imagery with imagery according to the present invention.
Figure 12B:
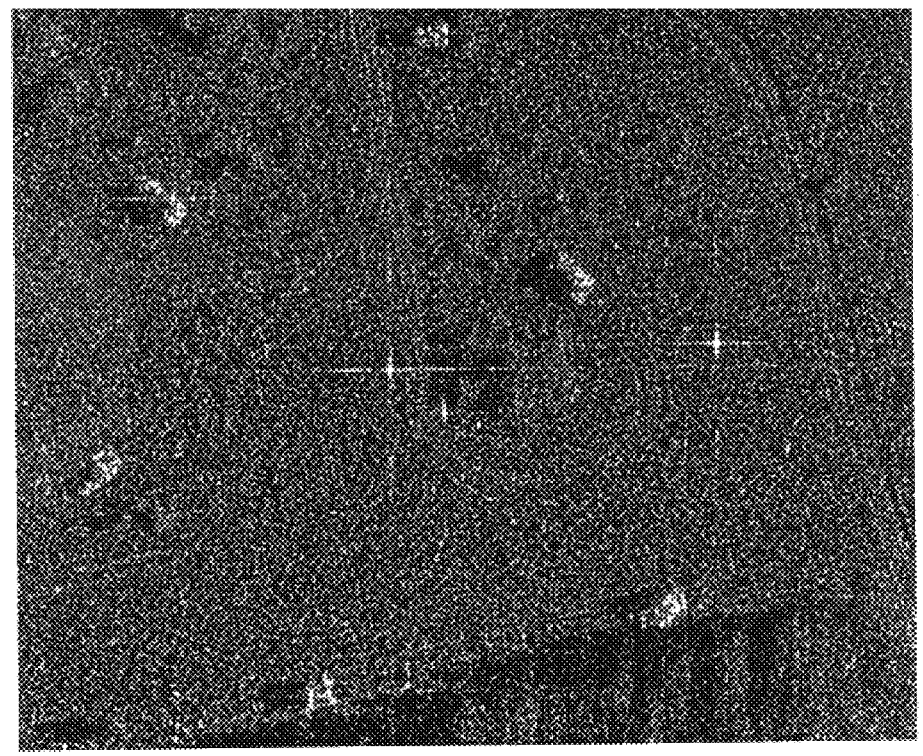

A comparison of Taylor-weighted conventional imagery with B-HDI (using image combining) is shown in FIGS. 12a ad 12b. FIG. 12a shows the Taylor weighted conventional imagery, while FIG. 12b shows the B-HDI image. The data are from a Lincoln Laboratory ADTS (Advanced Detection Technology Sensor) 1-foot resolution Ka-Band SAR collection in Stockbridge, N.Y. The scene contains several military vehicles in a field with a line of trees on the right-hand side, and two bright reflectors for calibration and registration. The display is limited to 28 dB dynamic range to reveal the increased background detail, especially the vehicle tracks on the ground (visibility will vary with print or copy quality).

Figure 13:
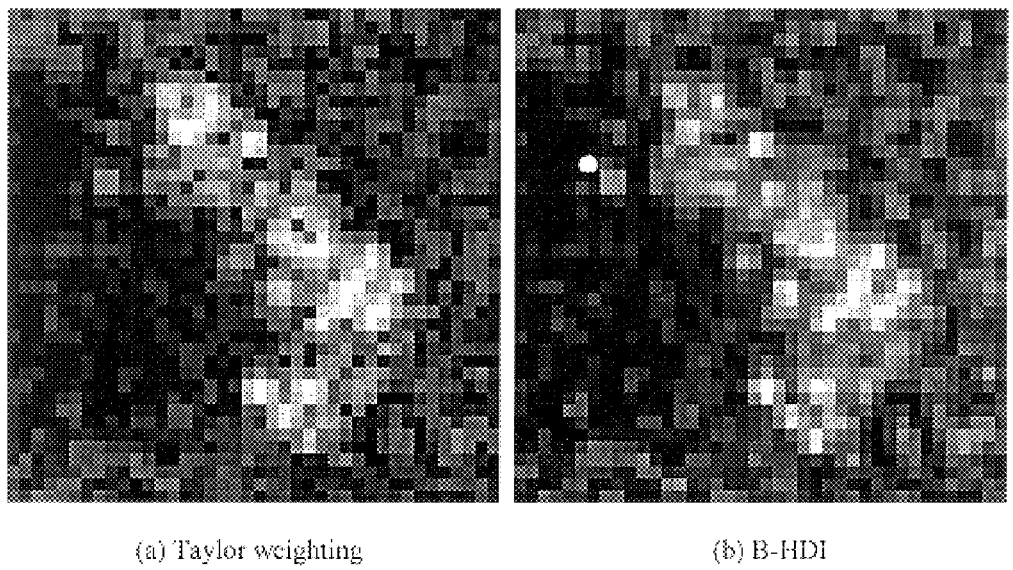
FIGS. 13 and 14 are close-ups of the target located near the center of FIGS. 12a and 12b.
Figure 14:
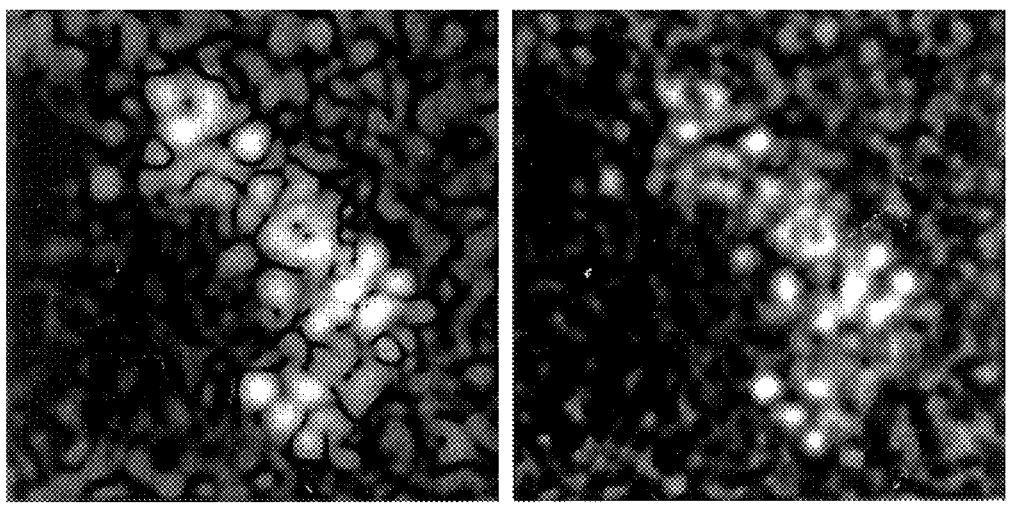

Improved target resolution is shown in a close-up of the target near the center, a tank, in FIGS. 13 and 14. FIG. 13 is at the original pixel spacing, and FIG. 14 is upsampled to clearly reveal the enhanced resolution. The utility of the component images combined in step 136 of image combining routine 212 is as follows: MLM provides the minimum at 40% of the pixels, the unweighted image at 50% and the Taylor weighted at 10%. These fractions vary with scene content.

Although the present invention has been shown and described with respect to several embodiments thereof, various changes, omissions and additions to the form and detail thereof, may be made therein, without departing from the spirit and scope of the invention.

For instance, the B-HDI application detailed above is specific to 2-dimensional (2-D) data and its formulation is somewhat arbitrary. For instance, the arbitrary choice of three beams in the 2-D case is open to modification. For example, the sum of adjacent pixels in equation (4) can be split into two beams, one beam comprised of the two range-adjacent pixels, and the other comprised of the two cross-range-adjacent pixels. This increases the number of beams to 4, increases the operations count, and increases the amount of nulling, i.e. reduction in target brightness. Thus, this may not be desirable.

Further, versions for n-dimensional data are feasible. For instance, an application to 1-D data, e.g. HRR (high range resolution) profiles, is as follows. Define two beams to be 1) the center range bin, and 2) the sum of adjacent range bins. Four looks are generated using preprocessing routine 106 and make beamspace looks 108. Then MVM routine 109 is used, with the results simplified using the facts that $y_3=0$ and $r_{31}=0$. Combination with conventional images may or may not help, but can be implemented in a fashion analogous to that described with respect to image combining routine 212.

Also, an alternative method of looks generation is to employ multiple range profiles, rather than spoiling the resolution of each look. For example, two range profiles collected over a small angular intercept will provide four looks.

In addition, while envisioned for use with SAR, the present invention can be used for other imaging modalities such as medical ultrasound and MRI.

What is claimed is:

1. A method of processing image data to produce a high-definition image, comprising the steps of:

receiving the image data; and adaptively processing the image data using a constrained minimum variance method to iteratively compute the high-definition image, wherein the high-definition image I is expressed in range and cross-range as $I(r,c)=\min \omega^H R \omega$, where $\omega$ is a weighting vector and R is a covariance matrix of the image data, wherein a solution for $I(r,c)$ is approximated by i) forming $Y=[x_1 \ldots x_K]^T/\sqrt{K}$, where $x_1 \ldots x_k$ are beamspace looks formed from image domain looks and with $y_1$, $y_2$, and $y_3$ denoting the K×1 columns of Y; ii) computing $r_{21}=y_2^T y_1$ and $r_{31}=y_3^T y_1$, and $b=r_{21}y_2+r_{31}y_3$; computing $\gamma$ as $$\gamma = \min\left(\frac{r_{21}^2 + r_{31}^2}{b^T b}, \sqrt{\frac{\beta-1}{r_{21}^2+r_{31}^2}}\right);$$

and iii) computing $I(r,c)$ as $I(r,c)=\|y_1-\gamma b\|^2$.

2. The method of claim 1 wherein the image data is $N_1 \times N_2$ complex valued image data, the method further comprising the step of:

forming image domain looks by:
 i) applying a FFT to convert the complex-valued image data into $M_1 \times M_2$ frequency-domain data;
 ii) removing any weighting function;
 iii) generating a plurality of frequency domain looks as a plurality of $M_{L,1} \times M_{L,2}$ subsets of the $M_1 \times M_2$ frequency domain data, where $M_{L,i}$ is an integer near $nM_i$ with $0<n<1$, $i=1,2$; and
 iv) transforming each frequency domain look into a corresponding image domain look using a $2M_{L,1} \times 2M_{L,2}$ inverse FFT, packing the data such that it is centered about zero frequency.

3. The method of claim 2, further comprising the step of:

for each image domain look, generating one beamspace look using a real part of the image domain look and generating a second beamspace look using an imaginary part of the image domain look.

4. The method of claim 1, further comprising the step of:

combining the high-definition image with an unweighted image and a Taylor weighted image to form a more detailed image by taking a pixel-by-pixel minimum of the high-definition image, unweighted image, and Taylor weighted image.

5. The method as per claim 4, wherein a filter is applied to sharpen the more detailed image.

6. The method of claim 1, wherein the image data is 2-D complex-valued image data.

7. The method of claim 6, wherein the 2-D image data is SAR data.

8. The method of claim 1, wherein the image data is 1-D image data.

9. The method of claim 8, wherein the 1-D image data is high range resolution profile data.

10. A system for processing image data to produce a high-definition image, comprising:
- a preprocessing routine to receive the image data and generate a plurality of image domain looks;
- a make beamspace looks routine to generate k beamspace looks, $x_1 \ldots x_k$, from the plurality of image domain looks;
- a minimum variance method routine to iteratively compute the high-definition image from the beamspace looks, wherein the high-definition image I is expressed in range and cross-range as $I(r,c)=\min \omega^H R \omega$, where $\omega$ is a weighting vector and R is a covariance matrix of the image data, wherein a solution for $I(r,c)$ is approximated by i) forming $Y=[x_1 \ldots x_K]^T/\sqrt{K}$, with $y_1$, $y_2$, and $y_3$ denoting the K×1 columns of Y; ii) computing $r_{21}=y_2^T y_1$ and $r_{31}=y_3^T y_1$, and $b=r_{21}y_2+r_{31}y_3$; computing $\gamma$ as $$\gamma = \min\left(\frac{r_{21}^2+r_{31}^2}{b^T b}, \sqrt{\frac{\beta-1}{r_{21}^2+r_{31}^2}}\right);$$

and iii) computing $I(r,c)$ as $I(r,c)=\|y_1-\gamma b\|^2$.

11. The system of claim 10 wherein the image data is $N_1 \times N_2$ complex valued image data and the preprocessing routine forms image domain looks by:
- i) applying a FFT to convert the complex-valued image data into $M_1 \times M_2$ frequency-domain data;
- ii) removing any weighting function;
- iii) generating a plurality of frequency domain looks as a plurality of $M_{L,1} \times M_{L,2}$ subsets of the $M_1 \times M_2$ frequency domain data, where $M_{L,i}$ is an integer near $nM_i$ with $0<n<1$, $i=1,2$; and
- iv) transforming each frequency domain look into a corresponding image domain look using a $2M_{L,1} \times 2M_{L,2}$ inverse FFT, packing the data such that it is centered about zero frequency.

12. The system of claim 11, wherein, for each image domain look, one beamspace look is generated using a real part of the image domain look and a second beamspace look is generated using an imaginary part of the image domain look.

13. The system of claim 10, further comprising:
- an image combining routine to combine the high-definition image with an unweighted image and a Taylor weighted image to form a more detailed image by taking a pixel-by-pixel minimum of the high-definition image, unweighted image, and Taylor weighted image.

14. The system of claim 13, wherein the image combining routine applies a filter to sharpen the more detailed image.

15. The system of claim 10, wherein the image data is 2-D complex-valued image data.

16. The system of claim 15, wherein the 2-D image data is SAR data.

17. The system of claim 10, wherein the image data is 1-D data.

18. The system of claim 17, wherein the 1-D image data is high range resolution profile data.

* * * * *

UNITED STATES PATENT AND TRADEMARK OFFICE
CERTIFICATE OF CORRECTION

| | | |
|---|---|---|
| PATENT NO. | : 6,608,585 B2 | Page 1 of 1 |
| APPLICATION NO. | : 10/086202 | |
| DATED | : August 19, 2003 | |
| INVENTOR(S) | : Benitz | |

It is certified that error appears in the above-identified patent and that said Letters Patent is hereby corrected as shown below:

Column 1, line 13 should read as follows:

--This invention was made with government support under Grant No. F19628-00-C-0002, awarded by the US Air Force. The government has certain rights in this invention.--

Signed and Sealed this
Tenth Day of May, 2011

David J. Kappos
*Director of the United States Patent and Trademark Office*